(12) United States Patent
Kim et al.

(10) Patent No.: US 7,505,792 B2
(45) Date of Patent: Mar. 17, 2009

(54) METHOD AND NETWORK APPARATUS FOR SELECTIVELY DISPLAYING MULTIPLE INFORMATION ITEMS RELATED TO NETWORK

(75) Inventors: Ki-hong Kim, Seoul (KR); Chee-hwan Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 521 days.

(21) Appl. No.: 11/251,756

(22) Filed: Oct. 18, 2005

(65) Prior Publication Data
US 2006/0084479 A1 Apr. 20, 2006

(30) Foreign Application Priority Data
Oct. 18, 2004 (KR) .................. 10-2004-0083205

(51) Int. Cl.
*H04M 1/00* (2006.01)
*H04M 3/42* (2006.01)
(52) U.S. Cl. .................. 455/566; 455/414.1; 455/67.7
(58) Field of Classification Search .......... 455/566, 455/414.1, 67.11, 115.1, 67.7, 423, 425, 455/39, 41.2; 370/468, 449, 477; 709/201, 709/206, 221, 229
See application file for complete search history.

(56) References Cited

U.S. PATENT DOCUMENTS

| | | | | |
|---|---|---|---|---|
| 6,049,549 A | * | 4/2000 | Ganz et al. | 370/449 |
| 6,052,120 A | * | 4/2000 | Nahi et al. | 715/700 |
| 6,924,727 B2 | * | 8/2005 | Nagaoka et al. | 340/3.1 |
| 7,035,912 B2 | * | 4/2006 | Arteaga | 709/217 |
| 2004/0058652 A1 | * | 3/2004 | McGregor et al. | 455/67.13 |
| 2006/0262769 A1 | * | 11/2006 | Ganz et al. | 370/346 |

FOREIGN PATENT DOCUMENTS

| | | |
|---|---|---|
| KR | 10-1999-009020 | 2/1999 |
| KR | 10-2001-0010580 | 2/2001 |
| KR | 10-2001-0105491 | 11/2001 |
| KR | 10-2002-0057267 | 7/2002 |
| KR | 2003-0067029 | 8/2003 |
| KR | 2004-0037670 | 5/2004 |

OTHER PUBLICATIONS

Notice of Examination Report for corresponding Korean Application No. 10-2004-0083205 dated Apr. 27, 2006.

* cited by examiner

*Primary Examiner*—Sonny Trinh
(74) *Attorney, Agent, or Firm*—Staas & Halsey LLP

(57) ABSTRACT

A method and network apparatus for selectively displaying multiple information items related to network are provided. The network apparatus for selectively displaying multiple network information items, includes a network transceiver transmitting and receiving data through a network and providing information relating to the activation status of the network and information relating to the amount of data being transmitted and received, an output unit selectively outputting one of the information relating to the activation status of the network and the information relating to the amount of data being transmitted and received, and a signal controller respectively controlling the activation state of the network and information output to the output unit according to a user's first input and second input.

22 Claims, 8 Drawing Sheets

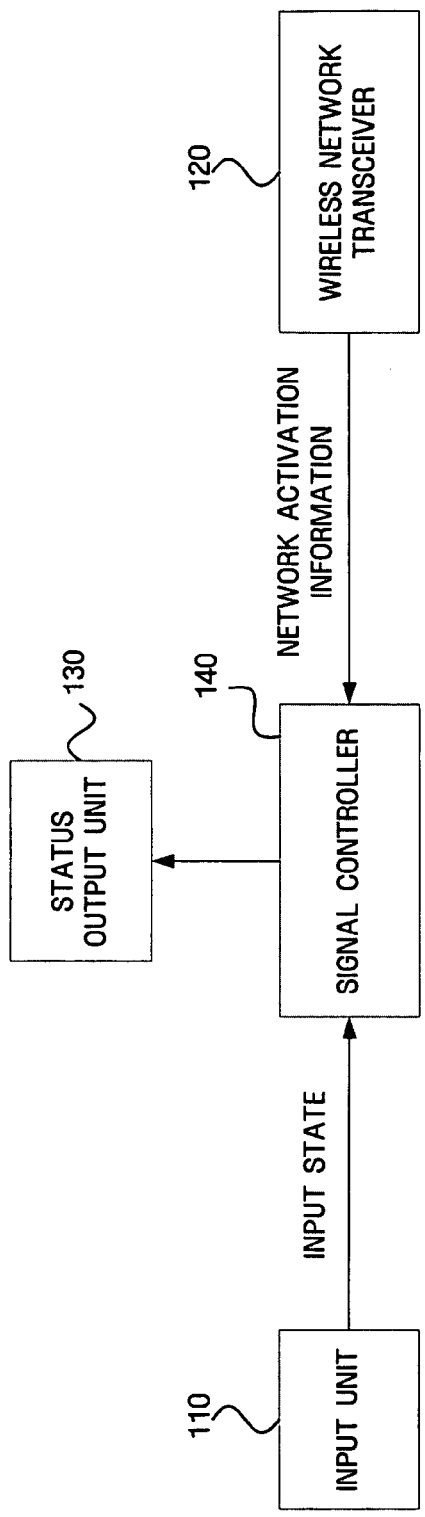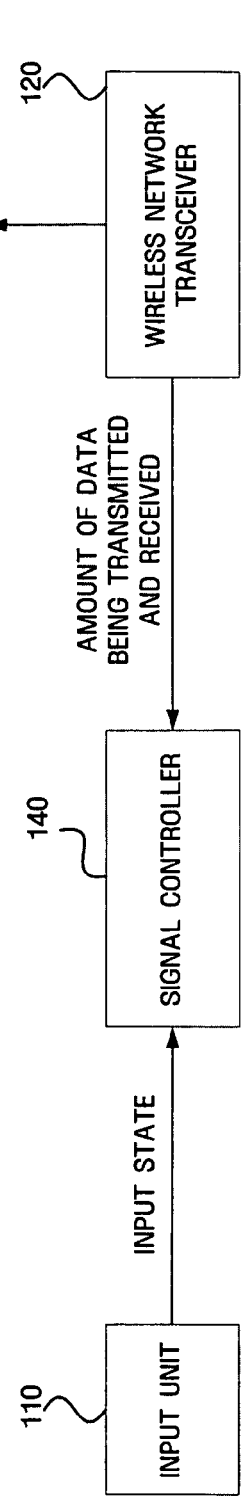

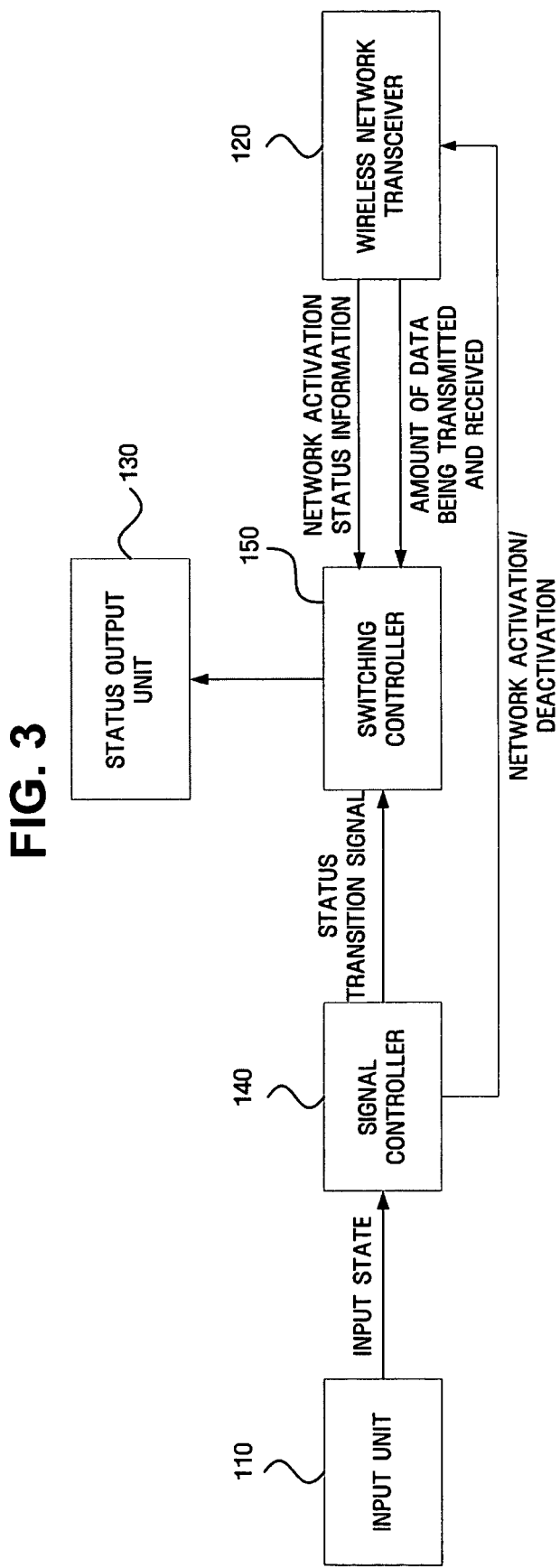

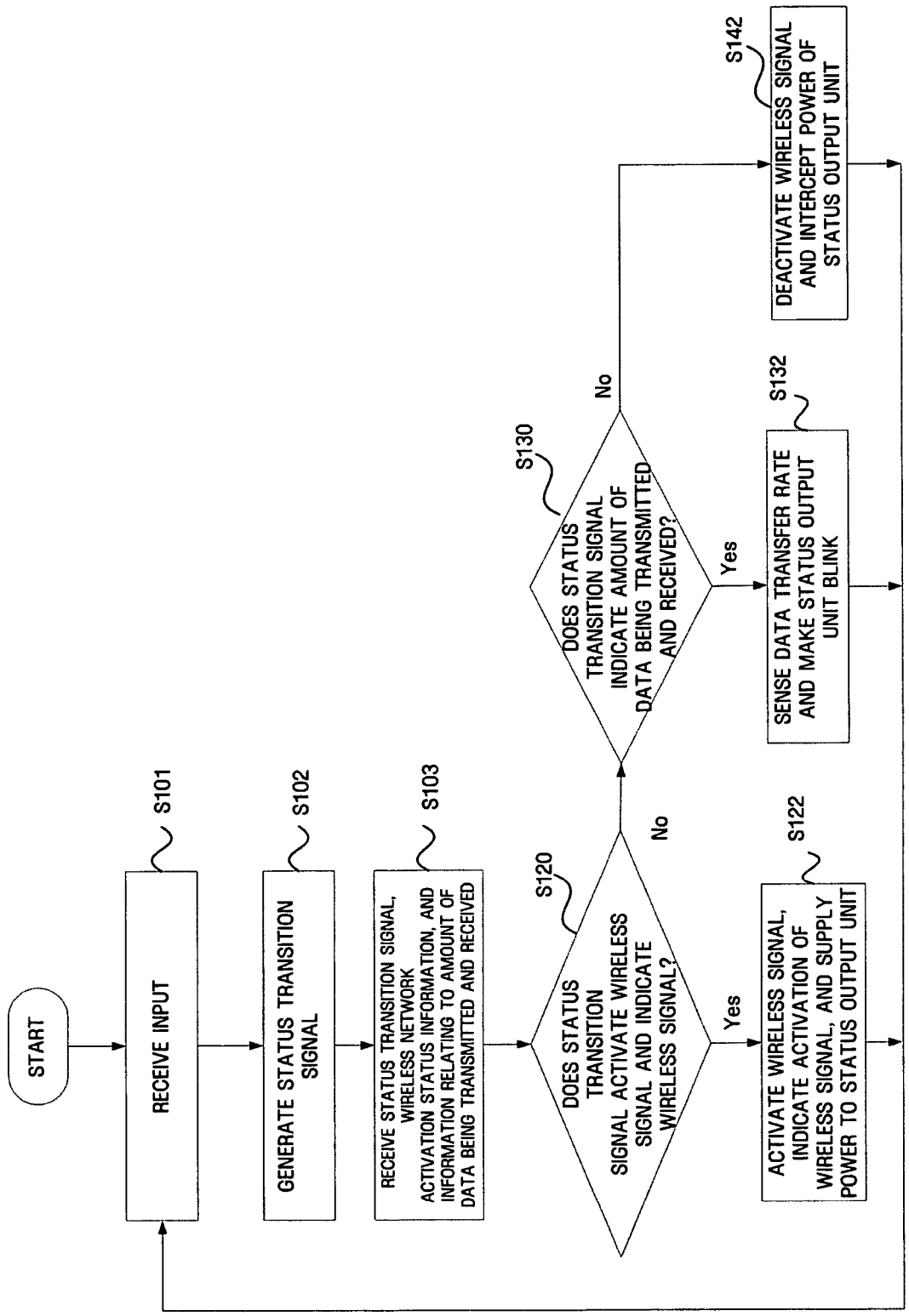

METHOD AND NETWORK APPARATUS FOR SELECTIVELY DISPLAYING MULTIPLE INFORMATION ITEMS RELATED TO NETWORK

CROSS-REFERENCE TO RELATED APPLICATIONS

This application claims priority from Korean Patent Application No. 10-2004-0083205 filed on Oct. 18, 2004 in the Korean Intellectual Property Office, the disclosure of which is incorporated herein by reference in its entirety.

BACKGROUND OF THE INVENTION

1. Field of the Invention

The present invention relates to a method of and network apparatus for selectively displaying multiple information items related to network.

2. Description of the Related Art

With the increasing popularity of the Internet and a rapid increase in multimedia data, the demand for super high-speed telecommunication networks continues to increase. A local area network (LAN) offered data transmission speeds of 1 to 4 Mbps when it was introduced in the late 1980's. 100 Mbps Fast Ethernet is most commonly used on LANs today and research into GigaBit Ethernet is being actively pursued. Attempts to access a network without a wire promotes research into and use of wireless LANs (WLANs). Despite low transmission rate and poor stability, the WLAN market is growing because of its ability to access a network wirelessly and improved mobility.

Due to the demand for increased transmission speed and advances in wireless data transfer technology, the original IEEE 802.11 standard providing 1 to 2 Mbps has improved, and currently specifications such as 802.11a, 802.11b, and 802.11g have been approved or are being developed by standardization committees. In particular, 802.11a offering a 6 to 54 Mbps data transfer rate in the national information infrastructure (NII) 5 GHz band based on an Orthogonal Frequency Division Multiplexing (OFDM) scheme is the most promising standard because of the increased attention in transmission using OFDM and the use of the 5 GHz band.

Examples of standards for wireless data communication systems whose standardizations are finalized or under way include a Wide Code Division Multiple Access (WCDMA) that is a third generation (3G) communication standard, IEEE 802.11x, Bluetooth, and IEEE 802.15.3. IEEE802.11b is the most common and cheapest standard for wireless data communications among IEEE 802.11x family. A WLAN compliant with the IEEE 802.11b standard delivers a data transfer rate of up to 11 Mbps in the 2.4 GHz Industrial, Scientific, Medial (ISM) band that can be used without a license within certain maximum emitted power limits. The demand for WLANs employing the IEEE 802.11a standard offering a data transfer rate of up to 54 Mbps using OFDM is increasing and research into IEEE 802.11g operating in the 2.4 GHz band using OFDM is actively being conducted.

Meanwhile, current networks, rather than networks connecting personal computers, connect all devices to other devices intending to exchange data whereas construction of wired networks was a major issue in the past. Due to new wiring installation, and restricted mobility of the wired networks, however, there is a need for wireless communication technology. Wireless Local Area Network (WLAN) covering a range of 50 to 100 m and Wireless Personal Area Network (WPAN) as the short-range wireless network standard of less than 10 m are being currently standardized as wireless network technologies.

The IEEE 802.15 Working Group developed the WPAN as the standard of a wireless network, and has four task groups (TGs) TG1 through TG4. TG1 establishes WPAN standards based on Bluetooth 1.x, and TG2 involves research into coexistence of wireless networks. TG3 is a group that is now conducting research into a transmission system having a transmission speed of a high data rate of 200 Mbps or greater using UltraWideband (UWB) while consuming a smaller amount of power, and TG4 investigates ZigBee suitable for a low data rate transmission of up to 250 Kbps with very low power consumption.

Technologies associated with wired networks, WLANs, and Wireless Personal Area Networks (WPANs) move from the research phase into commercialization. Wired/wireless data communication technologies are used in information apparatuses such as computers, notebooks, and personal digital assistants (PDAs) as well as home networking devices including digital TVs, set-top-boxes (STBs), and refrigerators. In particular, wireless data communication requires an apparatus for displaying transmission and reception of data. A status output unit using a light-emitting diode (LED) is typically used for this purpose to indicate the operation status of a network. An apparatus for displaying operation status in a wireless network will now be described because active/inactive status and data transmission of the wireless network can be easily affected by a surrounding environment.

FIG. 1 is a diagram of a conventional apparatus for indicating the active/inactive status of a network.

Referring to FIG. 1, the apparatus includes an input unit 110, a signal controller 140, a wireless network transceiver 120, and a status output unit 130. The input unit 110 typically using a button key transmits a signal indicating an input button is pushed or released to the signal controller 140 when the button is pressed down or released. The signal controller 140 determines how to process the signal under a current status of a wireless network, e.g., whether to activate the wireless network, and sends the result to the wireless network transceiver 120. The wireless network transceiver 120 is a typical LAN card and is responsible for wireless communication. The wireless network transceiver 120 determines whether to activate the wireless network according to the requirements provided by the signal controller 140, performs an operation according to the result of the determination, and sends information relating to activation of the wireless network to the signal controller 140. A mini-PCI (MPCI) card that is the most commonly used WLAN card provides information relating to the activation of a wireless network through pin 13.

The signal controller 140 brightens or darkens the status output unit 130 according to whether the received network activation status information. The status output unit 130 is typically a light-emitting device such as an LED and looks bright or dark according to a value sent by the signal controller 140.

FIG. 2 is a diagram of a conventional apparatus for displaying the amount of data being transmitted and received.

Referring to FIG. 2, the conventional apparatus includes an input unit 110, a signal controller 140, a wireless network transceiver 120, and a status output unit 130. The input unit 110 typically uses a button key to transmit a signal indicating an input button is pushed or released to the signal controller 140 when the button is pressed down or released. The signal controller 140 determines how to process the signal under a current status of a wireless network, e.g., whether to activate the wireless network, and sends the result to the wireless network transceiver 120.

The wireless network transceiver 120 determines whether to activate the wireless network according to the requirements provided by the signal controller 140. In general, the wireless network is activated by applying power to the wireless network transceiver 120. After activation of the wireless network, the wireless network transceiver 120 sends information relating to the amount of data being transmitted and received to the status output unit 130. When a large amount of data is being transmitted and received, the status output unit 130 that is a light-emitting device such as a LED will flicker at a high rate. Conversely, when a small amount of data is being transmitted and received, the status output unit 130 will flicker at a low rate. A MPCI card that is the most commonly used WLAN card provides information relating to the amount of data being transmitted through pin 12.

The apparatus of FIG. 1 may inform a user of the active/inactive status of a wireless signal for transmitting or receiving data on a wireless network but not provide any information relating to whether data is being transmitted or received over the wireless network, e.g., whether a large amount of data is being transmitted or received or whether no data is being transmitted or received despite a connection to the wireless network.

On the other hand, the apparatus shown in FIG. 2 can check the amount of data being transmitted and received through the wireless network and indicated the amount through the speed at which the LED flickers but flickering may irritate the user. In particular, repeated LED flickering may distract the user's concentration on work.

Korean Laid-open Patent Application No. 2001-010580 proposes an apparatus and method for displaying a decoded channel status of a base station by checking the status of a network channel and indicating the result using a mono-color LED. However, although the apparatus allows a base station to check the operation status of all networks, it does not perform a function to activate the network within an environment where network devices operate or indicate a channel status.

Thus, as described with reference to FIGS. 1 and 2, there is a need to develop a status output unit that is easy to use and indicates a network status. One of the most challenging problems is adding this function without making significant changes to the structure of a conventional wireless network apparatus. That is, there is a need for an apparatus and method for displaying the operation status of a wireless network to a user without changing the structure of a conventional wireless network apparatus.

SUMMARY OF THE INVENTION

Additional aspects and/or advantages of the invention will be set forth in part in the description which follows and, in part, will be apparent from the description, or may be learned by practice of the invention.

The present invention provides an apparatus and method for visually displaying multiple information items related to a network to a user.

The present invention also provides an apparatus and method for displaying multiple information items related to a network using circuitry in a conventional network.

The above stated aspects as well as other aspects, features and advantages, of the present invention will become clear to those skilled in the art upon review of the following description.

According to an aspect of the present invention, there is provided a network apparatus for selectively displaying multiple network information items, including a network transceiver transmitting and receiving data through a network and providing information relating to activation status of the network and information relating to the amount of data being transmitted and received, an output unit selectively outputting either information relating to the activation status of the network or information relating to the amount of data being transmitted and received, and a signal controller respectively controlling the activation state of the network and information output to the output unit according to the user's first input and second input.

According to another aspect of the present invention, there is provided a method of selectively displaying multiple network information items, including transmitting and receiving data through a network and providing information relating to the activation status of the network and information relating to the amount of data being transmitted and received, selectively outputting one of the information relating to the activation status of the network and the information relating to the amount of data being transmitted and received, and controlling the activation state of the network and information being output according to a user's first input and second input, respectively.

BRIEF DESCRIPTION OF THE DRAWINGS

The above features, these and/or other aspects and advantages of the invention will become apparent and more readily appreciated from the following description of the embodiments taken in conjunction with the accompanying drawings in which:

The above and other features and advantages of the present invention will become more apparent by describing in detail preferred embodiments thereof with reference to the attached drawings in which:

FIG. 1 is a diagram of a conventional apparatus for indicating the active/inactive status of a network;

FIG. 2 is a diagram of a conventional apparatus for displaying the amount of data being transmitted and received;

FIG. 3 is a diagram of a network apparatus for displaying network activation status information as well as the amount of data being transmitted and received according to an embodiment of the present invention;

FIG. 9 is a flowchart illustrating a process of displaying the status of a wireless network and the amount of data being transmitted and received according to an embodiment of the present invention.

DETAILED DESCRIPTION OF THE PREFERRED EMBODIMENTS

Figure 4:
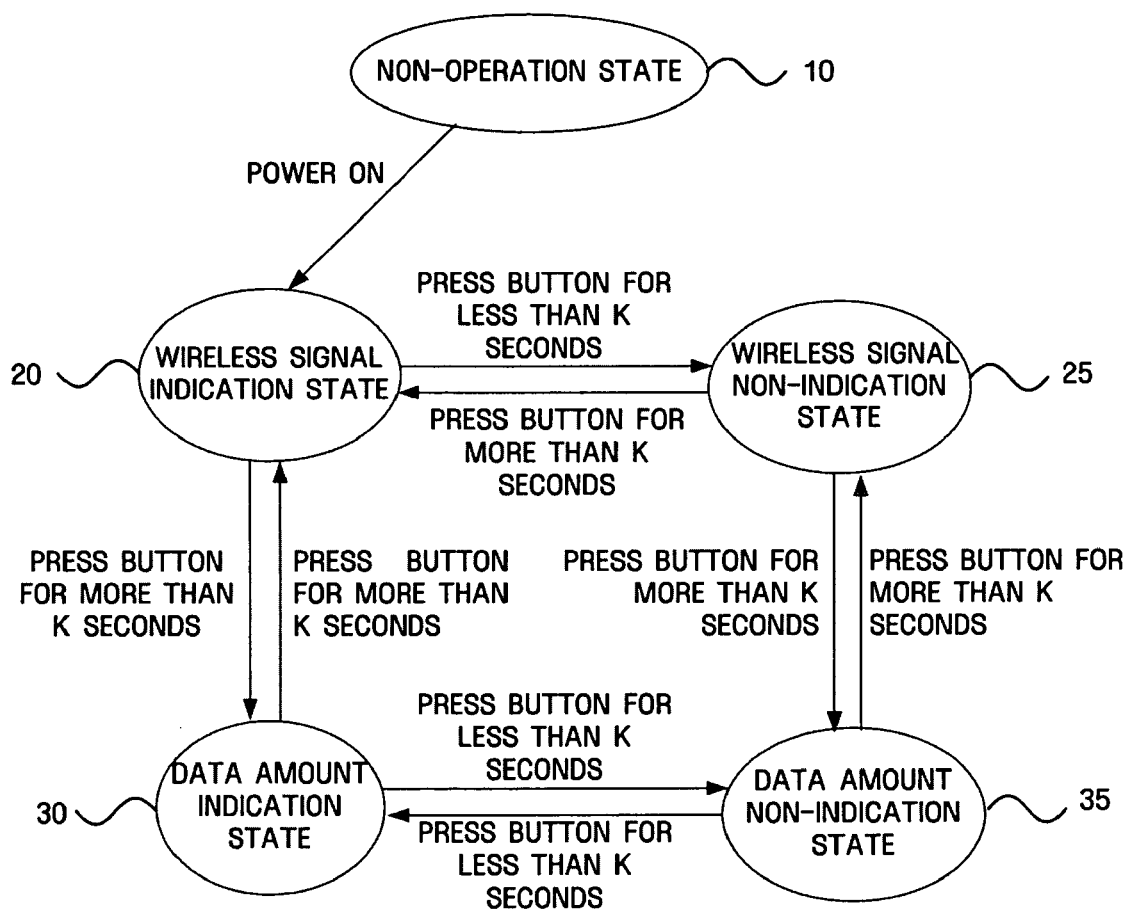
FIG. 4 is a diagram showing changes in state of the wireless network transceiver and the switching controller shown in FIG. 3 depending on an input from a button according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The term 'unit' as used herein, that is, 'module' or 'table' means, but is not limited to, a software or hardware component, such as a Field Programmable Gate Array (FPGA) or Application Specific Integrated Circuit (ASIC), which performs certain tasks. A unit or module may advantageously be configured to reside on the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

Prior to describing the preferred embodiments, the following definitions are provided to clarify terms used throughout this specification.

Network—Networks are classified into wired and wireless networks. Examples of wired networks may include a conventional local area network (LAN), a power line communication network, and an IEEE 1394 network. Protocols constituting a wireless network are classified into Wireless LAN (WLAN) and Wireless Personal Area Network (WPAN) protocols. The IEEE 802.11 WLAN standard has specifications such as 802.11a, 802.11b, and 802.11g whose standardizations are finalized or under way through a standardization committee. The IEEE 802.15 Working Group for WPANs is now conducting a standardization work of WPAN based on Bluetooth 1.x. TG2 is a group that establishes the Bluetooth standards, and TG2 is a group that makes a technical analysis of methods for enabling the Bluetooth products and the existing wireless LAN business to coexist. TG3 is a group that researches the standard of lower power consumption, and is now conducting research into a transmission system having a transmission speed of more than 20 Mbps using a Ultra Wideband (UWB). TG4 is investigating ZigBee technology offering a low data rate of up to 250 Kbps with very low power consumption. While the present invention is described with reference to a wireless network whose performance can easily change depending on surrounding circumstances by way of example, the present invention is not limited thereto. The wireless networks include 802.11 wireless networks such as 802.11a, 802.11b, 802.11g, or 802.11n wireless networks, 802.15 wireless networks such as Bluetooth, UWB or ZigBee wireless networks, and any other networks enabling wireless data communications.

Input unit—An input unit realized through a typical push button checks the status of a wireless network and performs an input function for transition of the status. The push button may be mounted on a digital device, or a keyboard, a mouse, a tablet pen or a remote control controlling the digital device. The input unit may have other hardware construction. For example, the input unit may be a slide button or a rotary-type unit. Furthermore, in computers, PDAs, and notebooks, the input unit may be realized by software by providing a button input such as an icon to a user through a display, which allows the user to perform an input using a mouse, a keyboard, a remote control, and a tablet pen.

Status output unit—A status output unit indicates information relating to the activation status of a current wireless network and the amount of data being transmitted and received through a wireless network. A mono color LED was conventionally used as a status output unit. In the present invention, a mono-color or multi-color LED may be used. For example, the mono-color LED turns on or off or blinks to indicate the status of a wireless network. The multi-color LED may flicker bright red to indicate the operation of the wireless network or change from pale red to dark red in order to indicate the amount of data being transmitted and received. The multi-color LED may indicate the amount of data being transmitted and received by changing saturation as well as brightness. For example, the multi-color LED may emit a bright color to indicate a large amount of data is being transmitted.

FIG. 3 is a diagram of a network apparatus for displaying network activation information as well as the amount of data being transmitted and received according to an embodiment of the present invention.

Referring to FIG. 3, the network apparatus includes an input unit 110, a signal controller 140, a switching controller 150, a status output unit 130, and a wireless network transceiver 120.

As described above, the input unit 110 may be realized through a hardware button or with software and receives an input for a user to select either information relating to the activation status of a network or information relating to the amount of data being transmitted and received through the network. There are two inputs: a first input for activating/deactivating the network and a second input for outputting either information relating to the activation status of the network or information relating to the amount of data being transmitted and received through the network.

The input may be realized through a push button. When the push button is pressed down for less than a threshold time, the first input is provided. When the push button is pressed for more than the threshold time, the second input is provided. Alternatively, the first and second inputs may be entered by two separate input buttons. When being entered through a single input button, the first and second inputs are sequentially transmitted to the signal controller 140. An input signal generated through the single input unit 110 is transmitted to the signal controller 140 that then checks the input status of the push button, i.e., whether the push button has been pressed or the amount of time the push button was pressed, and determines whether the input is the first or second input.

A rotary-type unit can perform the same function as the push button and be used as the input unit 110. The signal controller 140 combines various inputs entered by the input unit 110 to convert the combination result into a state transition signal that is used to change an output construction of the status output unit 130.

The wireless network transceiver 120 transmits and receives data through an accessible network such as an IEEE802.11 network and may be a typical WLAN card.

The wireless network transceiver 120 is activated or deactivated through a network active/inactive signal provided by the signal controller 140 according to a first input entered by the input unit 110. The wireless network transceiver 120 may be activated or deactivated by controlling power supplied to or a predetermined function of the wireless network transceiver 120.

The wireless network transceiver 120 sends information relating to the network status and the amount of data being transmitted and received through it to the switching controller 150.

When the wireless network transceiver 120 is a mini-PCI (MPCI) card that is the most commonly used WLAN card, the information relating to network activation status may be provided through pin 13 while the information relating to the amount of data being transmitted can be provided through pin 12.

The switching controller 150 selects whether to display information relating to activation/deactivation of the wireless network transceiver 120 or the amount of data being transmitted and received through the wireless network transceiver 120 according to the state or states transition signal received from the signal controller 140 and controls the status output unit 130 to output the selected information. Alternatively, the switching controller 150 may be integrated into the signal controller 140. In this case, the output construction of the status output unit 130 may be changed according to a signal output from the signal controller 140.

FIG. 4 is a diagram showing changes in state of the wireless network transceiver 120 and the switching controller 150 according to an embodiment of the present invention.

Five states of the wireless network transceiver 120 and the switching controller 150 are presented below:

(1) Non-operation state 10—A network apparatus does not operate normally in the non-operation state 10 in which no power is applied to the switching controller 150 or multiple components including the switching controller 150. The switching controller 150 operates normally in all states except the non-operation state.

(2) Wireless signal indication state 20—The wireless signal indication state 20 refers to a state in which the wireless network transceiver 120 is activated and the switching controller 150 outputs the network activation status information received from the wireless network transceiver 120 through the status output unit 130.

(3) Wireless signal non-indication state 25—The wireless signal non-indication state 25 refers to a state in which the wireless network transceiver 120 is deactivated so that no data is transmitted and received through a wireless network and the switching controller 150 outputs network activation status information received from the wireless network transceiver 120 through the status output unit 130. Since the wireless network transceiver 120 is deactivated in this state, the switching controller 150 outputs information indicating that the wireless network transceiver 120 is deactivated through the status output unit 130.

(4) Data amount indication state 30—The data amount indication state 30 refers to a state in which the wireless network transceiver 120 is activated and the switching controller 150 outputs information relating to the amount of data being transmitted and received that is provided through the wireless network transceiver 120 through the status output unit 130. When the status output unit 130 is a LED, the information relating to the amount of data being transmitted and received can be provided by changing the speed at which the LED blinks or the color of the LED.

(5) Data amount non-indication state 35—The data amount non-indication state 35 refers to a state in which the wireless network transceiver 120 is deactivated so that no data is transmitted and received through a wireless network and the switching controller 150 outputs information relating to the amount of data being transmitted and received from the wireless network transceiver 120 through the status output unit 130. Because, the wireless network transceiver 120 is deactivated in this state, the switching controller 150 outputs information indicating that the amount of data being transmitted and received is 0 through the status output unit 130.

A change in state of the network apparatus will now be described with reference to FIG. 4.

(A) Non-operation state 10 -> Wireless signal indication state 20—When the network apparatus begins to operate after leaving the non-operation state 10, it goes into the wireless signal indication state 20. When the network apparatus is in the wireless signal indication state 20, the wireless network transceiver 120 is activated and the switching controller 150 outputs network activation status information received from the wireless network transceiver 120 through the status output unit 130, so that the user can know whether a network is activated. The switching controller 150 sends a "high" signal at regular intervals to the status output unit 130 consisting of an LED that then emits light.

While it is described above that the network apparatus enters the wireless signal indication state 20 when operating after leaving the non-operation state 10, it may go into other various states. For example, the network apparatus may be put into the wireless network non-indication state 25.

(B) Wireless signal indication state 20 <-> Wireless signal non-indication state 25—When a first input is entered through the input unit 110, the network apparatus changes from the wireless signal indication state 20 into the wireless signal non-indication state 25 or vice versa. When the input unit 110 is a push button, the first input may be defined as an input entered by pressing down the push button for less than K seconds.

(C) Wireless signal indication state 20 <-> Data amount indication state 30—When a second input is entered through the input unit 110, the network apparatus changes from the wireless signal indication state 20 into the data amount indication state 30 or vice versa. When the input unit 110 is a push button, the second input can be defined as an input entered by pressing down the push button for more than K seconds.

(D) Data amount indication state 30 <-> Data amount non-indication state 35—When a first input is entered through the input unit 110, the network apparatus changes from the data amount indication state 30 into the data amount non-indication state 35 or vice versa. When the input unit 110 is a push button, the first input may be defined as an input entered by pressing down the push button for less than K seconds.

(E) Data amount non-indication state 35 <-> Wireless signal non-indication state 25—When a second input is entered through the input unit 110, the network apparatus changes from the data amount non-indication state 35 into the wireless signal non-indication state 25 or vice versa. When the input unit 110 is a push button, the second input can be defined as an input entered by pressing down the push button for more than K seconds.

Figure 5:
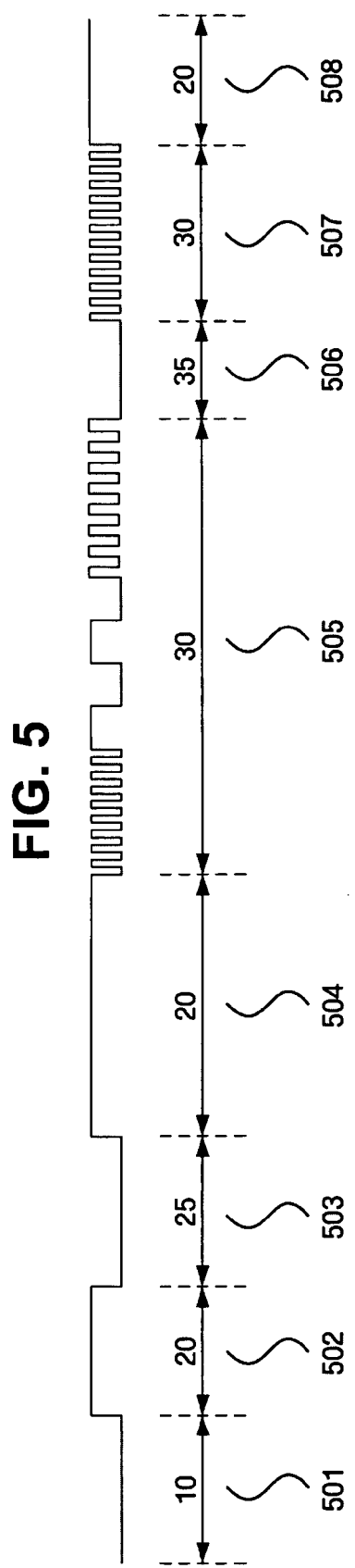
FIG. 5 is a diagram showing the waveform of a signal input to a status output unit that represents the state change shown in FIG. 4.

FIG. 5 is a diagram showing the waveform of a signal input to a status output unit to represent the status change shown in FIG. 4.

In the non-operation state 10 in which power is off and a low signal 501 is continuously input, a status output unit does not emit light nor blink. When a user turns on a digital device or a wireless network transceiver, the wireless network transceiver changes from the non-operation state 10 into the wireless signal indication state 20 in which the wireless network transceiver is activated, a wireless signal is generated, and a high signal 502 is continuously input. Subsequently, when the user presses an input button for a short period of time, a first input for controlling the active/inactive state of a wireless network is entered. Thus, a wireless signal changes into a low signal 503 corresponding to a deactivated state, which causes the wireless network transceiver to transit into the wireless signal non-indication state 25. The wireless signal non-indication state 25 can be toggled into the wireless signal indication state 30 in which the wireless signal is a high signal 504 corresponding to an activated state by pressing the input button for a short period of time.

In this case, when the user presses the button for a long period of time, a second input is entered so that the wireless network transceiver changes into the data amount indication state 30 and a signal 505 comprised of high and low signals that alternate repeatedly at intervals whose length varies according to the amount of data being transmitted and received is fed into the status output unit. As illustrated in FIG. 5, when a large amount of data is transmitted and received, the signal 505 alternates at high rates. Conversely, when a small amount of data is transmitted and received, the signal 505 alternates at long intervals. Repetition of high and low signals is indicated by a blinking light in the status output unit. On the other hand, when the user presses the button for a short period of time, the data amount indication state 30 switches into the data amount non-indication state 35 in which no signal is generated through the wireless network transceiver and a low signal 506 is fed into the status output unit. When the user presses the button for a short period of time again, the data amount non-indication state 35 switches into the data amount indication state 30 in which a signal 507 that alternates between high and low signals at a fast rate is generated when a large amount of data is transmitted and received. Subsequently, when the user presses down the button for a long period of time, the data amount indication state 30 changes into the wireless signal indication state 20 in which a high signal 508 is continuously generated.

The amount of time that the input button is pressed, the state changes shown in FIG. 4, and the waveform of a signal shown in FIG. 5 may vary depending on the type of application.

Figure 6:
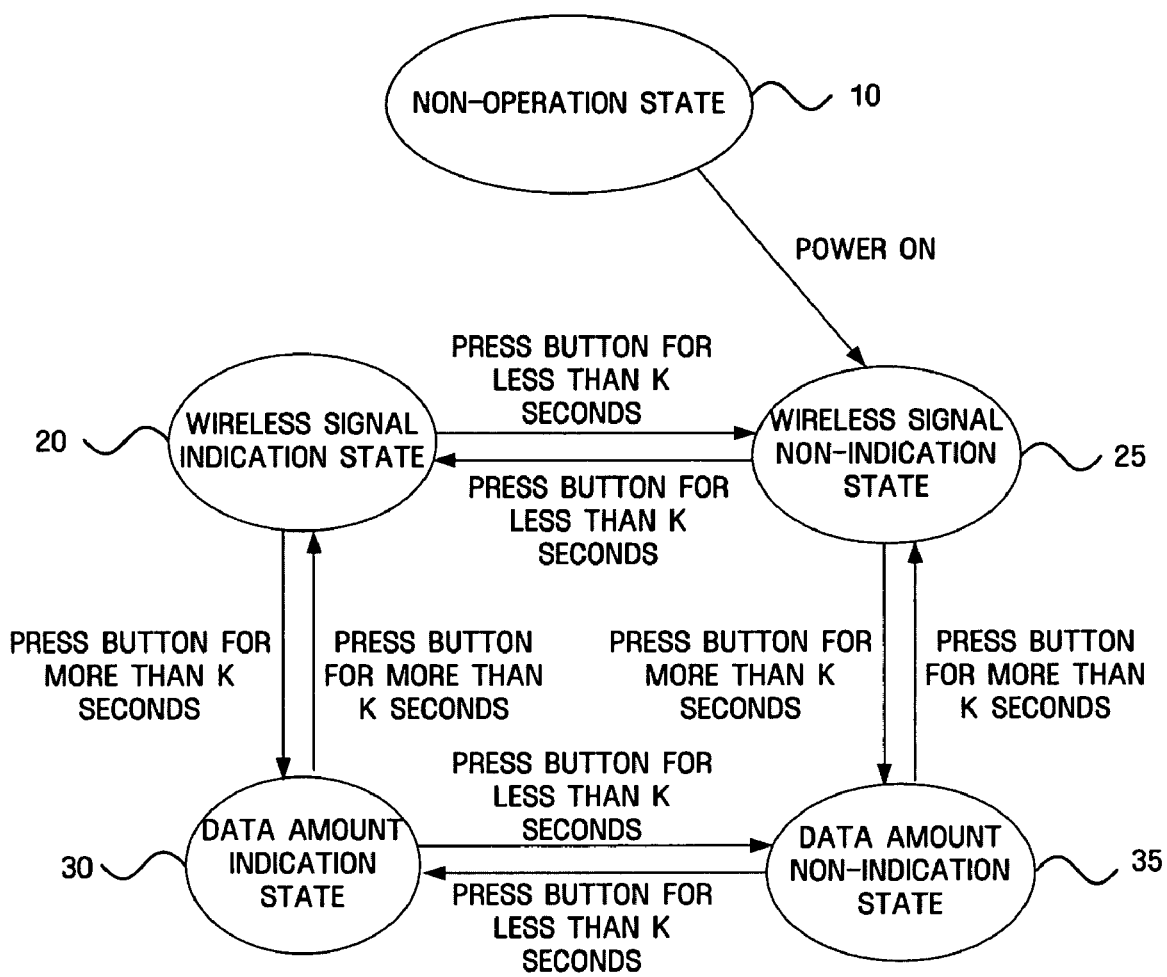
FIG. 6 is a diagram showing changes in state depending on an input from a button according to a second embodiment of the present invention.

FIG. 6 is a diagram showing changes in state depending on an input from a button according to a second embodiment of the present invention.

The state change shown in FIG. 6 is similar to that shown in FIG. 4. The difference is that when power is turned on in the non-operation state 10, the non-operation state 10 changes into a wireless signal non-indication state 25. When the user presses a push button for less than K seconds, a first input for activating a wireless network is entered so that the wireless signal non-indication state 25 changes into the wireless signal indication state 20. Because a transition into the data amount indication state 30 or the data amount non-indication state 35 occurs in the same manner as shown in FIG. 4, a detailed description thereof will not be given.

Figure 7:
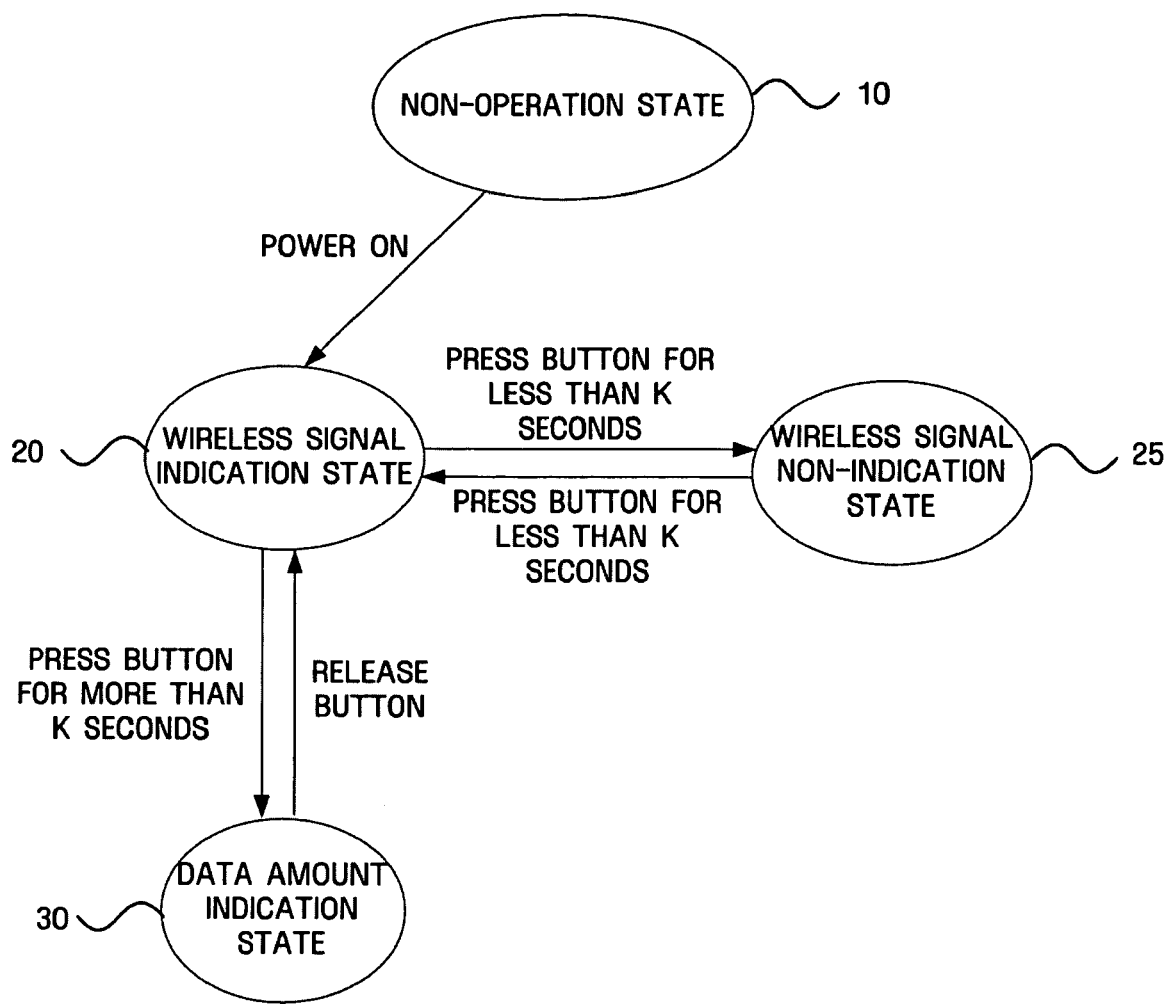
FIG. 7 is a diagram showing changes in state excluding changes to a data amount non-indication state according to an embodiment of the present invention.

FIG. 7 is a diagram showing transitions between states not including the data amount non-indication state 35 according to a third embodiment of the present invention.

Referring to FIG. 7, when power is turned on in the non-operation state 10, the non-operation state changes into the wireless signal indication state 20. When the user presses a push button for less than K seconds, a first input for deactivating a wireless network is entered so that the wireless signal indication state 20 changes into the wireless signal non-indication state 25. The transition between the two states can be made by pressing an input button for less than K seconds.

On the other hand, when the user presses down the button for more than K seconds, a second input for controlling the output of information relating to the wireless network is entered so that the wireless signal indication state 20 changes into the data amount indication state 30. Unlike in the embodiments shown in FIGS. 4 and 6, a network apparatus is in the data amount indication state 30 while the button remains pressed for more than K seconds. When the button is released, the second input is also entered so that the apparatus returns to the wireless network indication state 20.

Figure 8:
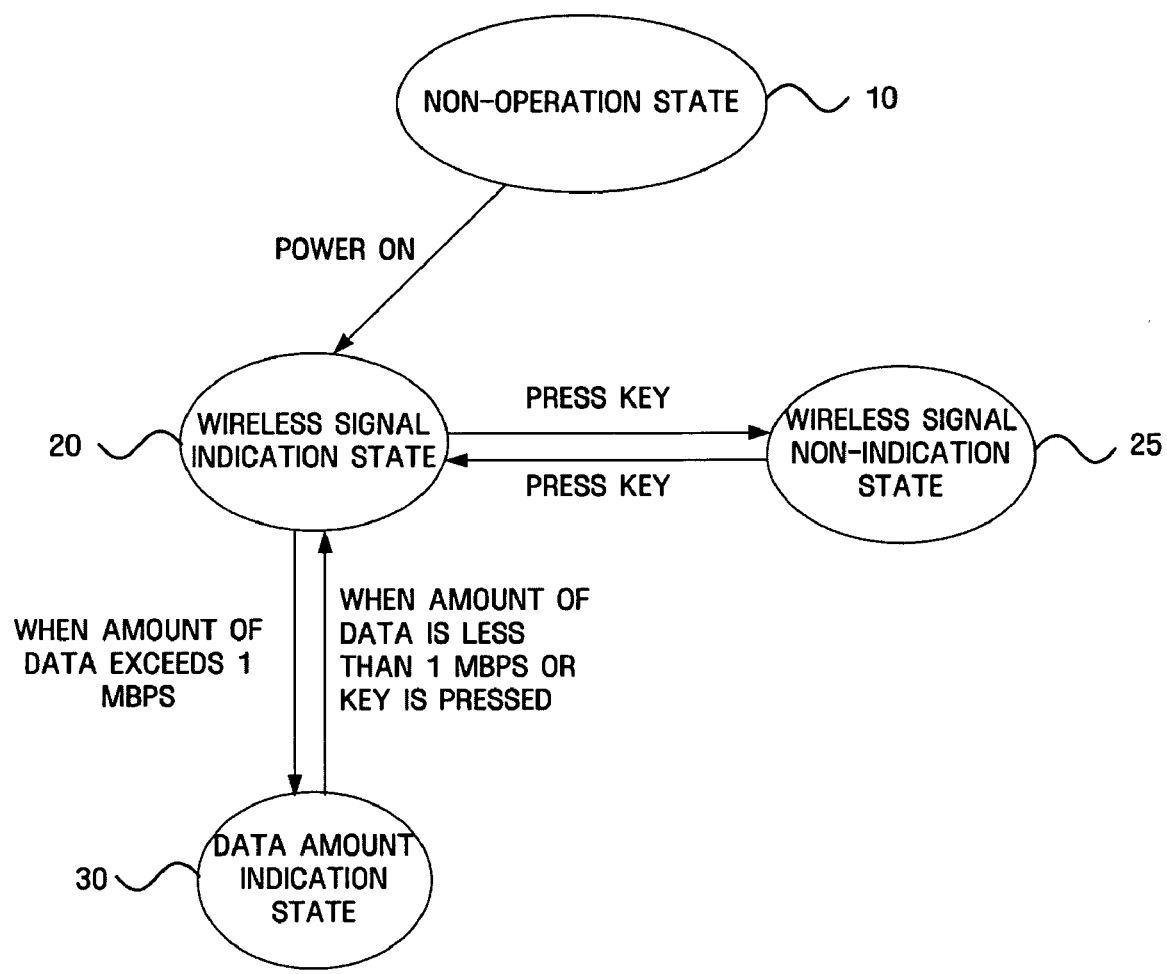
FIG. 8 is a diagram showing changes in state made according to the amount of data being transmitted and received according to an embodiment of the present invention.

FIG. 8 is a diagram showing a state change made according to the amount of data being transmitted and received according to a fourth embodiment of the present invention.

Referring to FIG. 8, when power is turned on in a non-operation state 10, the non-operation state 10 changes into the wireless signal non-indication state 25. A transition between the wireless signal indication state 20 and the wireless signal non-indication state 25 can be made by pressing a button (or key) of an input unit. When the amount of data being transmitted and received increases to 1 Megabit per second (Mbps) in the wireless signal indication state 20, the wireless signal indication state 20 changes into the data amount indication state 30. When the amount of data being transmitted and received is more than 1 Mbps, a status output unit continues to blink or changes color to indicate that the amount of data exceeds a predetermined value (1 Mbps). When the amount of data drops below 1 Mbps, the data amount indication state 30 changes back into the wireless signal indication state 20.

When blinking of the status output unit in the data amount indication state 30 irritates a user, the user can change a state from the data amount indication state 30 back into the wireless signal indication state 20 by pressing a key (second input), thereby preventing the wireless signal indication state 20 from changing into the data amount indication state 30 even if the amount of data being transmitted and received is greater than 1 Mbps. While it is described above that the state change is controlled by the amount of data being transmitted and received (1 Mbps), this change can also be controlled by adjusting the amount of time that the input button is pressed as illustrated in FIGS. 4, 6, and 7.

FIG. 9 is a flowchart illustrating a process of displaying the status of a wireless network and the amount of data being transmitted and received according to an embodiment of the present invention.

Referring to FIG. 9, in step S101, an input unit receives an input indicating a button is pushed or released. In step S102, a state transition signal is generated according to the input received by the input unit, i.e., the amount of time that a button in the input unit is pressed, whether the button is released. In step S103, a switching controller receives the status transition signal, information relating to the activation status of a wireless network, and information relating to the amount of data being transmitted and received. When the received input is the status transition signal activating a wireless signal and indicating the activation status of the wireless signal in step S120, the switching controller activates the wireless signal and supplies power to a status output unit so that a user can know the activation status of the wireless signal in step S122.

Meanwhile, when the state transition signal requests an indication of the amount of data being transmitted and received in step S130, the switching controller senses the amount of data and causes the status output unit to blink at a rate corresponding to the data transfer rate in step S132. On the other hand, when the state transition signal does not request this indication, in step S142, the switching controller deactivates a wireless signal and intercepts the power of the status output unit. Because the current output state is stored in the switching controller, the current output state can change into another state according to a status transition signal that is subsequently generated by a signal controller.

As described above, the method and apparatus according to the present invention provide a visual display of information relating to the activation status of a network and the amount of data being transmitted and received to a user.

In addition, the present invention allows for a display of multiple information items related to a network by adding a switching controller to conventional network circuitry.

It will be understood by those of ordinary skill in the art that various changes in form and details may be made therein without departing from the spirit and scope of the present invention as defined by the following claims. Therefore, it is to be appreciated that the above described exemplary embodiments embodiment is are for purposes of illustration only and not to be construed as a limitation of the invention. The scope of the invention is given by the appended claims, rather than the preceding description, and all variations and equivalents which fall within the range of the claims are intended to be embraced therein.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A network apparatus for selectively displaying multiple network information items, comprising:
    a network transceiver transmitting and receiving data through a network and providing information relating to the activation status of the network and information relating to the amount of data being transmitted and received;
    an output unit selectively outputting one of the information relating to the activation status of the network and the information relating to the amount of data being transmitted and received; and
    a signal controller respectively controlling the activation state of the network and information output to the output unit according to a user's first input and second input.

2. The apparatus of claim 1, further comprising a switching controller receiving the information relating to the activation status of the network and the information relating to the amount of data being transmitted and received from the network transceiver and selectively providing one of the information relating to the activation status of the network and the information relating to the amount of data being transmitted and received to the output unit according to the second input of the signal controller (the user's second input.

3. The apparatus of claim 1, further comprising an input unit selectively providing one of the first and second inputs according to the amount of time that an input button is pressed.

4. The apparatus of claim 1, wherein when the network is activated and the second input requests that the information relating to the amount of data being transmitted and received be output, the output unit outputs the information relating to the amount of data.

5. The apparatus of claim 4, wherein when a first input deactivating the network is entered after the second input, the output unit outputs no data.

6. The apparatus of claim 5, wherein when a first input activating the network is entered after the first input, the output unit outputs the information relating to the amount of data.

7. The apparatus of claim 1, wherein when the network is activated and the second input requests that the information relating to the activation status of the network be output, the output unit outputs the information relating to the activation status of the network.

8. The apparatus of claim 7, wherein when a first input deactivating the network is entered after the second input, the output unit ceases to output the information relating to the activation status of the network.

9. The apparatus of claim 8, wherein when a first input activating the network is entered after the first input, the output unit outputs the information relating to the amount of data.

10. The apparatus of claim 1, wherein the network is a network transmitting and receiving data on a wireless basis.

11. The apparatus of claim 10, wherein the network is activated by activating a wireless signal.

12. A method of selectively displaying multiple network information items, comprising:
    transmitting and receiving data through a network and providing information relating to the activation status of the network and information relating to the amount of data being transmitted and received;
    selectively outputting one of the information relating to the activation status of the network and the information relating to the amount of data being transmitted and received; and
    controlling the activation state of the network and information being output according to a user's first input and second input, respectively.

13. The method of claim 12, further comprising receiving the information relating to the activation status of the network and the information relating to the amount of data being transmitted and received and selectively providing one of the information relating to the activation status of the network and the information relating to the amount of data being transmitted and received to the output unit according to the second input.

14. The method of claim 12, further comprising selectively providing one of the first and second inputs according to the amount of time that an input button is pressed.

15. The method of claim 12, further comprising outputting the information relating to the amount of data when the network is activated and the second input requests that the information relating to the amount of data being transmitted and received be output.

16. The method of claim 15, further comprising ceasing to output the information relating to the amount of data when a first input deactivating the network is entered after the second input.

17. The method of claim 16, further comprising outputting the information relating to the amount of data when a first input activating the network is entered after the first input.

18. The method of claim 12, further comprising outputting the information relating to the activation status of the network when the network is activated and the second input requests that the information relating to the activation status of the network be output to the output unit.

19. The method of claim 18, further comprising ceasing to output the information relating to the activation status of the network when a first input deactivating the network is entered after the second input.

20. The method of claim 19, further comprising outputting the information relating to the amount of data when a first input activating the network is entered after the first input.

21. The method of claim 12, wherein the network is a network transmitting and receiving data on a wireless basis.

22. The method of claim 21, wherein the network is activated by activating a wireless signal.

* * * * *

UNITED STATES PATENT AND TRADEMARK OFFICE
CERTIFICATE OF CORRECTION

PATENT NO. : 7,505,792 B2  Page 1 of 1
APPLICATION NO. : 11/251756
DATED : March 17, 2009
INVENTOR(S) : Ki-hong Kim et al.

It is certified that error appears in the above-identified patent and that said Letters Patent is hereby corrected as shown below:

Column 11, Line 50, change "(the user's second input." to --(the user's second input).--.

Signed and Sealed this

Twenty-fifth Day of August, 2009

David J. Kappos
*Director of the United States Patent and Trademark Office*